(12) United States Patent
Taylor et al.

(10) Patent No.: US 7,405,672 B2
(45) Date of Patent: Jul. 29, 2008

(54) AIR TREATMENT DEVICE HAVING A SENSOR

(75) Inventors: Charles E. Taylor, Punta Gorda, FL (US); Andrew J. Parker, Novato, CA (US); Shek Fai Lau, Foster City, CA (US)

(73) Assignee: Sharper Image Corp., San Francisco, CA (US)

( * ) Notice: Subject to any disclaimer, the term of this patent is extended or adjusted under 35 U.S.C. 154(b) by 389 days.

(21) Appl. No.: 10/809,923

(22) Filed: Mar. 25, 2004

(65) Prior Publication Data

US 2004/0202547 A1 Oct. 14, 2004

Related U.S. Application Data

(60) Provisional application No. 60/461,734, filed on Apr. 9, 2003.

(51) Int. Cl.
*G08B 17/10* (2006.01)
(52) U.S. Cl. .................... 340/629; 340/539.1; 422/120
(58) Field of Classification Search ................ 340/629, 340/630, 539.1, 555; 96/77, 96; 422/120
See application file for complete search history.

(56) References Cited

U.S. PATENT DOCUMENTS

| 653,421 A | 7/1900 | Lorey |
| 895,729 A | 8/1908 | Carlborg |
| 995,958 A | 6/1911 | Goldberg |
| 1,791,338 A | 2/1931 | Wintermute |
| 1,869,335 A | 7/1932 | Day |
| 1,882,949 A | 10/1932 | Ruder |
| 2,129,783 A | 9/1938 | Penney |
| 2,247,409 A | 7/1941 | Roper |
| 2,327,588 A | 8/1943 | Bennett |
| 2,359,057 A | 9/1944 | Skinner |
| 2,509,548 A | 5/1950 | White |
| 2,590,447 A | 3/1952 | Nord et al. |
| 2,949,550 A | 8/1960 | Brown |
| 2,978,066 A | 4/1961 | Nodolf |
| 3,018,394 A | 1/1962 | Brown |
| 3,026,964 A | 3/1962 | Penney |
| 3,374,941 A | 3/1968 | Okress |
| 3,412,530 A | 11/1968 | Cardiff |
| 3,518,462 A | 6/1970 | Brown |

(Continued)

FOREIGN PATENT DOCUMENTS

CN 2111112 U 7/1972

(Continued)

OTHER PUBLICATIONS

U.S. Appl. No. 10/405,193, filed Apr. 1, 2003, Lee et al.

(Continued)

*Primary Examiner*—Phung T Nguyen
(74) *Attorney, Agent, or Firm*—Bell, Boyd & Lloyd LLP

(57) ABSTRACT

An air treatment device having electrodes supported by a housing and a voltage generator operatively coupled to the electrodes. The air treatment device includes at least one sensor operatively coupled to the voltage generator for sensing a condition and providing signals used for adjusting the voltage generated by the voltage generator.

20 Claims, 7 Drawing Sheets

U.S. PATENT DOCUMENTS

| | | |
|---|---|---|
| 3,540,191 A | 11/1970 | Herman |
| 3,581,470 A | 6/1971 | Aitkenhead et al. |
| 3,638,058 A | 1/1972 | Fritzius |
| 3,744,216 A | 7/1973 | Halloran |
| 3,806,763 A | 4/1974 | Masuda |
| 3,892,927 A | 7/1975 | Lindenberg |
| 3,945,813 A | 3/1976 | Iinoya et al. |
| 3,958,960 A | 5/1976 | Bakke |
| 3,958,961 A | 5/1976 | Bakke |
| 3,958,962 A | 5/1976 | Hayashi |
| 3,981,695 A | 9/1976 | Fuchs |
| 3,984,215 A | 10/1976 | Zucker |
| 3,988,131 A | 10/1976 | Kanazawa et al. |
| 4,007,024 A | 2/1977 | Sallee et al. |
| 4,052,177 A | 10/1977 | Kide |
| 4,056,372 A | 11/1977 | Hayashi |
| 4,070,163 A | 1/1978 | Kolb et al. |
| 4,074,983 A | 2/1978 | Bakke |
| 4,092,134 A | 5/1978 | Kikuchi |
| 4,097,252 A | 6/1978 | Kirchhoff et al. |
| 4,102,654 A | 7/1978 | Pellin |
| 4,104,042 A | 8/1978 | Brozenick |
| 4,110,086 A | 8/1978 | Schwab et al. |
| 4,119,415 A | 10/1978 | Hayashi et al. |
| 4,126,434 A | 11/1978 | Keiichi |
| 4,138,233 A | 2/1979 | Masuda |
| 4,147,522 A | 4/1979 | Gonas et al. |
| 4,155,792 A | 5/1979 | Gelhaar et al. |
| 4,171,975 A | 10/1979 | Kato et al. |
| 4,185,971 A | 1/1980 | Isahaya |
| 4,189,308 A | 2/1980 | Feldman |
| 4,205,969 A | 6/1980 | Matsumoto |
| 4,209,306 A | 6/1980 | Feldman et al. |
| 4,218,225 A | 8/1980 | Kirchhoff et al. |
| 4,225,323 A | 9/1980 | Zarchy et al. |
| 4,227,894 A | 10/1980 | Proynoff |
| 4,231,766 A | 11/1980 | Spurgin |
| 4,232,355 A | 11/1980 | Finger et al. |
| 4,244,710 A | 1/1981 | Burger |
| 4,244,712 A | 1/1981 | Tongret |
| 4,251,234 A | 2/1981 | Chang |
| 4,253,852 A | 3/1981 | Adams |
| 4,259,093 A | 3/1981 | Vlastos et al. |
| 4,259,452 A | 3/1981 | Yukuta et al. |
| 4,259,707 A | 3/1981 | Penney |
| 4,264,343 A | 4/1981 | Natarajan et al. ............. 55/126 |
| 4,266,948 A | 5/1981 | Teague et al. |
| 4,282,014 A | 8/1981 | Winkler et al. |
| 4,284,420 A | 8/1981 | Borysiak |
| 4,289,504 A | 9/1981 | Scholes |
| 4,293,319 A | 10/1981 | Claassen, Jr. |
| 4,308,036 A | 12/1981 | Zahedi et al. |
| 4,315,188 A | 2/1982 | Cerny et al. |
| 4,318,718 A | 3/1982 | Utsumi et al. |
| 4,338,560 A | 7/1982 | Lemley |
| 4,342,571 A | 8/1982 | Hayashi |
| 4,349,359 A | 9/1982 | Fitch et al. |
| 4,351,648 A | 9/1982 | Penney |
| 4,354,861 A | 10/1982 | Kalt |
| 4,357,150 A | 11/1982 | Masuda et al. |
| 4,362,632 A | 12/1982 | Jacob |
| 4,363,072 A | 12/1982 | Coggins |
| 4,366,525 A | 12/1982 | Baumgartner |
| 4,369,776 A | 1/1983 | Roberts |
| 4,375,364 A | 3/1983 | Van Hoesen et al. |
| 4,380,900 A | 4/1983 | Linder et al. |
| 4,386,395 A | 5/1983 | Francis, Jr. |
| 4,391,614 A | 7/1983 | Rozmus |
| 4,394,239 A | 7/1983 | Kitzelmann et al. |
| 4,405,342 A | 9/1983 | Bergman |
| 4,406,671 A | 9/1983 | Rozmus |
| 4,412,850 A | 11/1983 | Kurata et al. |
| 4,413,225 A | 11/1983 | Donig et al. |
| 4,414,603 A | 11/1983 | Masuda |
| 4,435,190 A | 3/1984 | Taillet et al. |
| 4,440,552 A | 4/1984 | Uchiya et al. |
| 4,443,234 A | 4/1984 | Carlsson |
| 4,445,911 A | 5/1984 | Lind |
| 4,477,263 A | 10/1984 | Shaver et al. |
| 4,477,268 A | 10/1984 | Kalt |
| 4,481,017 A | 11/1984 | Furlong |
| 4,496,375 A | 1/1985 | Le Vantine |
| 4,502,002 A | 2/1985 | Ando |
| 4,505,724 A | 3/1985 | Baab |
| 4,509,958 A | 4/1985 | Masuda et al. |
| 4,514,780 A | 4/1985 | Brussee et al. |
| 4,515,982 A | 5/1985 | Lechtken et al. |
| 4,516,991 A | 5/1985 | Kawashima |
| 4,521,229 A | 6/1985 | Baker et al. |
| 4,522,634 A | 6/1985 | Frank |
| 4,534,776 A | 8/1985 | Mammel et al. |
| 4,536,698 A | 8/1985 | Shevalenko et al. |
| 4,544,382 A | 10/1985 | Taillet et al. |
| 4,555,252 A | 11/1985 | Eckstein |
| 4,569,684 A | 2/1986 | Ibbott |
| 4,582,961 A | 4/1986 | Frederiksen |
| 4,587,475 A | 5/1986 | Finney, Jr. et al. |
| 4,588,423 A | 5/1986 | Gillingham et al. |
| 4,590,042 A | 5/1986 | Drage |
| 4,597,780 A | 7/1986 | Reif |
| 4,597,781 A | 7/1986 | Spector |
| 4,600,411 A | 7/1986 | Santamaria |
| 4,601,733 A | 7/1986 | Ordines et al. |
| 4,604,174 A | 8/1986 | Bollinger et al. |
| 4,614,573 A | 9/1986 | Masuda |
| 4,623,365 A | 11/1986 | Bergman |
| 4,626,261 A | 12/1986 | Jorgensen |
| 4,632,135 A | 12/1986 | Lenting et al. |
| 4,632,746 A | 12/1986 | Bergman |
| 4,636,981 A | 1/1987 | Ogura |
| 4,643,744 A | 2/1987 | Brooks |
| 4,643,745 A | 2/1987 | Sakakibara et al. |
| 4,647,836 A | 3/1987 | Olsen |
| 4,650,648 A | 3/1987 | Beer et al. |
| 4,656,010 A | 4/1987 | Leitzke et al. |
| 4,657,738 A | 4/1987 | Kanter et al. |
| 4,659,342 A | 4/1987 | Lind |
| 4,662,903 A | 5/1987 | Yanagawa |
| 4,666,474 A | 5/1987 | Cook |
| 4,668,479 A | 5/1987 | Manabe et al. |
| 4,670,026 A | 6/1987 | Hoenig |
| 4,673,416 A | 6/1987 | Sakakibara et al. |
| 4,674,003 A | 6/1987 | Zylka |
| 4,677,426 A * | 6/1987 | Dattilo ...................... 340/627 |
| 4,680,496 A | 7/1987 | Letournel et al. |
| 4,686,370 A | 8/1987 | Blach |
| 4,689,056 A | 8/1987 | Noguchi et al. |
| 4,691,829 A | 9/1987 | Auer |
| 4,692,174 A | 9/1987 | Gelfand et al. |
| 4,693,869 A | 9/1987 | Pfaff |
| 4,694,376 A | 9/1987 | Gesslauer |
| 4,702,752 A | 10/1987 | Yanagawa |
| 4,713,092 A | 12/1987 | Kikuchi et al. |
| 4,713,093 A | 12/1987 | Hansson |
| 4,713,724 A | 12/1987 | Voelkel |
| 4,715,870 A | 12/1987 | Masuda et al. |
| 4,725,289 A | 2/1988 | Quintilian |
| 4,726,812 A | 2/1988 | Hirth |
| 4,726,814 A | 2/1988 | Weitman |
| 4,736,127 A | 4/1988 | Jacobsen |
| 4,743,275 A | 5/1988 | Flanagan |
| 4,749,390 A | 6/1988 | Burnett et al. |
| 4,750,921 A | 6/1988 | Sugita et al. |
| 4,760,302 A | 7/1988 | Jacobsen |

| | | | | | | |
|---|---|---|---|---|---|---|
| 4,760,303 A | 7/1988 | Miyake | | 5,254,155 A | 10/1993 | Mensi |
| 4,765,802 A | 8/1988 | Gombos et al. | | 5,266,004 A | 11/1993 | Tsumurai et al. |
| 4,771,361 A | 9/1988 | Varga | | 5,271,763 A | 12/1993 | Jang |
| 4,772,297 A | 9/1988 | Anzai | | 5,282,891 A | 2/1994 | Durham |
| 4,779,182 A | 10/1988 | Mickal et al. | | 5,290,343 A | 3/1994 | Morita et al. |
| 4,781,736 A | 11/1988 | Cheney et al. | | 5,296,019 A | 3/1994 | Oakley et al. |
| 4,786,844 A | 11/1988 | Farrell et al. | | 5,302,190 A | 4/1994 | Williams |
| 4,789,801 A * | 12/1988 | Lee ............................ 310/308 | | 5,308,586 A | 5/1994 | Fritsche et al. |
| 4,808,200 A | 2/1989 | Dallhammer et al. | | 5,315,838 A | 5/1994 | Thompson |
| 4,811,159 A | 3/1989 | Foster, Jr. | | 5,316,741 A | 5/1994 | Sewell et al. |
| 4,822,381 A | 4/1989 | Mosley et al. | | 5,330,559 A | 7/1994 | Cheney et al. |
| 4,853,005 A | 8/1989 | Jaisinghani et al. | | 5,348,571 A | 9/1994 | Weber |
| 4,869,736 A | 9/1989 | Ivester et al. | | 5,376,168 A | 12/1994 | Inculet |
| 4,892,713 A | 1/1990 | Newman | | 5,378,978 A | 1/1995 | Gallo et al. |
| 4,929,139 A | 5/1990 | Vorreiter et al. | | 5,386,839 A | 2/1995 | Chen |
| 4,940,470 A | 7/1990 | Jaisinghani et al. | | 5,395,430 A | 3/1995 | Lundgren et al. |
| 4,940,894 A | 7/1990 | Morters | | 5,401,301 A | 3/1995 | Schulmerich et al. |
| 4,941,068 A | 7/1990 | Hofmann | | 5,401,302 A | 3/1995 | Schulmerich et al. |
| 4,941,224 A | 7/1990 | Saeki et al. | | 5,403,383 A | 4/1995 | Jaisinghani |
| 4,944,778 A | 7/1990 | Yanagawa | | 5,405,434 A | 4/1995 | Inculet |
| 4,954,320 A | 9/1990 | Birmingham et al. | | 5,407,469 A | 4/1995 | Sun |
| 4,955,991 A | 9/1990 | Torok et al. | | 5,407,639 A | 4/1995 | Watanabe et al. |
| 4,966,666 A | 10/1990 | Waltonen | | 5,417,936 A | 5/1995 | Suzuki et al. |
| 4,967,119 A | 10/1990 | Torok et al. | | 5,419,953 A | 5/1995 | Chapman |
| 4,976,752 A | 12/1990 | Torok et al. | | 5,433,772 A | 7/1995 | Sikora |
| 4,978,372 A | 12/1990 | Pick | | 5,435,817 A | 7/1995 | Davis et al. |
| D315,598 S | 3/1991 | Yamamoto et al. | | 5,435,978 A | 7/1995 | Yokomi |
| 5,003,774 A | 4/1991 | Leonard | | 5,437,713 A | 8/1995 | Chang |
| 5,006,761 A | 4/1991 | Torok et al. | | 5,437,843 A | 8/1995 | Kuan |
| 5,010,869 A | 4/1991 | Lee | | 5,445,798 A | 8/1995 | Ikeda et al. |
| 5,012,093 A | 4/1991 | Shimizu | | 5,466,279 A | 11/1995 | Hattori et al. |
| 5,012,094 A | 4/1991 | Hamade | | 5,468,454 A | 11/1995 | Kim |
| 5,012,159 A | 4/1991 | Torok et al. | | 5,474,599 A | 12/1995 | Cheney et al. |
| 5,022,979 A | 6/1991 | Hijikata et al. | | 5,484,472 A | 1/1996 | Weinberg |
| 5,024,685 A | 6/1991 | Torok et al. | | 5,484,473 A | 1/1996 | Bontempi |
| 5,030,254 A | 7/1991 | Heyen et al. | | 5,492,678 A | 2/1996 | Ota et al. |
| 5,034,033 A | 7/1991 | Alsup et al. | | 5,501,844 A | 3/1996 | Kasting, Jr. et al. |
| 5,037,456 A | 8/1991 | Yu | | 5,503,808 A | 4/1996 | Garbutt et al. |
| 5,045,095 A | 9/1991 | You | | 5,503,809 A | 4/1996 | Coate et al. |
| 5,053,912 A | 10/1991 | Loreth et al. | | 5,505,914 A | 4/1996 | Tona-Serra |
| 5,059,219 A | 10/1991 | Plaks et al. | | 5,508,008 A | 4/1996 | Wasser |
| 5,061,462 A | 10/1991 | Suzuki | | 5,514,345 A | 5/1996 | Garbutt et al. |
| 5,066,313 A | 11/1991 | Mallory, Sr. | | 5,516,493 A | 5/1996 | Bell et al. |
| 5,072,746 A | 12/1991 | Kantor | | 5,518,531 A | 5/1996 | Joannu |
| 5,076,820 A | 12/1991 | Gurvitz | | 5,520,887 A | 5/1996 | Shimizu et al. |
| 5,077,468 A | 12/1991 | Hamade | | 5,525,310 A | 6/1996 | Decker et al. |
| 5,077,500 A | 12/1991 | Torok et al. | | 5,529,613 A | 6/1996 | Yavnieli |
| 5,100,440 A | 3/1992 | Stahel et al. | | 5,529,760 A | 6/1996 | Burris |
| RE33,927 E | 5/1992 | Fuzimura | | 5,532,798 A | 7/1996 | Nakagami et al. |
| D326,514 S | 5/1992 | Alsup et al. | | 5,535,089 A * | 7/1996 | Ford et al. .................. 361/231 |
| 5,118,942 A | 6/1992 | Hamade | | 5,536,477 A | 7/1996 | Cha et al. |
| 5,125,936 A | 6/1992 | Johansson | | 5,538,695 A | 7/1996 | Shinjo et al. |
| 5,136,461 A | 8/1992 | Zellweger | | 5,540,761 A | 7/1996 | Yamamoto |
| 5,137,546 A | 8/1992 | Steinbacher et al. | | 5,542,967 A | 8/1996 | Ponizovsky et al. |
| 5,141,529 A | 8/1992 | Oakley et al. | | 5,545,379 A | 8/1996 | Gray |
| 5,141,715 A | 8/1992 | Sackinger et al. | | 5,545,380 A | 8/1996 | Gray |
| D329,284 S | 9/1992 | Patton | | 5,547,643 A | 8/1996 | Nomoto et al. |
| 5,147,429 A | 9/1992 | Bartholomew et al. | | 5,549,874 A | 8/1996 | Kamiya et al. |
| 5,154,733 A | 10/1992 | Fujii et al. | | 5,554,344 A | 9/1996 | Duarte |
| 5,158,580 A | 10/1992 | Chang | | 5,554,345 A | 9/1996 | Kitchenman |
| D332,655 S | 1/1993 | Lytle et al. | | 5,565,685 A | 10/1996 | Czako et al. |
| 5,180,404 A | 1/1993 | Loreth et al. | | 5,569,368 A | 10/1996 | Larsky et al. |
| 5,183,480 A | 2/1993 | Raterman et al. | | 5,569,437 A | 10/1996 | Stiehl et al. |
| 5,196,171 A | 3/1993 | Peltier | | D375,546 S | 11/1996 | Lee |
| 5,198,003 A | 3/1993 | Haynes | | 5,571,483 A | 11/1996 | Pfingstl et al. |
| 5,199,257 A | 4/1993 | Colletta et al. | | 5,572,327 A * | 11/1996 | Plinke et al. ................ 356/438 |
| 5,210,678 A | 5/1993 | Lain et al. | | 5,573,577 A | 11/1996 | Joannou |
| 5,215,558 A | 6/1993 | Moon | | 5,573,730 A | 11/1996 | Gillum |
| 5,217,504 A | 6/1993 | Johansson | | 5,578,112 A | 11/1996 | Krause |
| 5,217,511 A | 6/1993 | Plaks et al. | | 5,578,280 A | 11/1996 | Kazi et al. |
| 5,234,555 A | 8/1993 | Ibbott | | 5,582,632 A | 12/1996 | Nohr et al. |
| 5,248,324 A | 9/1993 | Hara | | 5,587,131 A | 12/1996 | Malkin et al. |
| 5,250,267 A | 10/1993 | Johnson et al. | | D377,523 S | 1/1997 | Marvin et al. |

| | | | | | | |
|---|---|---|---|---|---|---|
| 5,591,253 A | 1/1997 | Altman et al. | | 6,296,692 B1 | 10/2001 | Gutmann |
| 5,591,334 A | 1/1997 | Shimizu et al. | | 6,302,944 B1 | 10/2001 | Hoenig |
| 5,591,412 A | 1/1997 | Jones et al. | | 6,309,514 B1 | 10/2001 | Conrad et al. |
| 5,593,476 A | 1/1997 | Coppom | | 6,312,507 B1 * | 11/2001 | Taylor et al. ............... 96/19 |
| 5,601,636 A | 2/1997 | Glucksman | | 6,315,821 B1 | 11/2001 | Pillion et al. |
| 5,603,752 A | 2/1997 | Hara | | 6,328,791 B1 | 12/2001 | Pillion et al. |
| 5,603,893 A | 2/1997 | Gundersen et al. | | 6,348,103 B1 | 2/2002 | Ahlborn et al. |
| 5,614,002 A | 3/1997 | Chen | | 6,350,417 B1 | 2/2002 | Lau et al. |
| 5,624,476 A | 4/1997 | Eyraud | | 6,362,604 B1 | 3/2002 | Cravey |
| 5,630,866 A | 5/1997 | Gregg | | 6,372,097 B1 | 4/2002 | Chen |
| 5,630,990 A | 5/1997 | Conrad et al. | | 6,373,723 B1 | 4/2002 | Wallgren et al. |
| 5,637,198 A | 6/1997 | Breault | | 6,379,427 B1 | 4/2002 | Siess |
| 5,637,279 A | 6/1997 | Besen et al. | | 6,391,259 B1 | 5/2002 | Malkin et al. |
| 5,641,342 A | 6/1997 | Smith et al. | | 6,398,852 B1 | 6/2002 | Loreth |
| 5,641,461 A | 6/1997 | Ferone | | 6,447,587 B1 | 9/2002 | Pillion et al. |
| 5,647,890 A | 7/1997 | Yamamoto | | 6,451,266 B1 | 9/2002 | Lau et al. |
| 5,648,049 A | 7/1997 | Jones et al. | | 6,464,754 B1 | 10/2002 | Ford |
| 5,655,210 A | 8/1997 | Gregoire et al. | | 6,471,753 B1 | 10/2002 | Ahn et al. |
| 5,656,063 A * | 8/1997 | Hsu ............................ 95/58 | | 6,494,940 B1 | 12/2002 | Hak |
| 5,665,147 A | 9/1997 | Taylor et al. | | 6,497,754 B2 | 12/2002 | Joannou |
| 5,667,563 A | 9/1997 | Silva, Jr. | | 6,504,308 B1 | 1/2003 | Krichtafovitch et al. |
| 5,667,564 A | 9/1997 | Weinberg | | 6,506,238 B1 | 1/2003 | Endo |
| 5,667,565 A | 9/1997 | Gondar | | 6,508,982 B1 | 1/2003 | Shoji |
| 5,667,756 A | 9/1997 | Ho | | 6,544,485 B1 | 4/2003 | Taylor |
| 5,669,963 A | 9/1997 | Horton et al. | | 6,576,046 B2 | 6/2003 | Pruette et al. |
| 5,678,237 A | 10/1997 | Powell et al. | | 6,585,935 B1 | 7/2003 | Taylor et al. |
| 5,681,434 A | 10/1997 | Eastlund | | 6,588,434 B2 | 7/2003 | Taylor et al. |
| 5,681,533 A | 10/1997 | Hiromi | | 6,603,268 B2 | 8/2003 | Lee |
| 5,698,164 A | 12/1997 | Kishioka et al. | | 6,613,277 B1 | 9/2003 | Monagan |
| 5,702,507 A | 12/1997 | Wang | | 6,632,407 B1 | 10/2003 | Lau et al. |
| D389,567 S | 1/1998 | Gudefin | | 6,635,105 B2 | 10/2003 | Ahlborn et al. |
| 5,766,318 A | 6/1998 | Loreth et al. | | 6,635,106 B2 | 10/2003 | Katou et al. |
| 5,779,769 A | 7/1998 | Jiang | | 6,672,315 B2 | 1/2004 | Taylor et al. |
| 5,785,631 A | 7/1998 | Heidecke | | 6,680,028 B1 | 1/2004 | Harris |
| 5,814,135 A | 9/1998 | Weinberg | | 6,709,484 B2 | 3/2004 | Lau et al. |
| 5,879,435 A | 3/1999 | Satyapal et al. | | 6,713,026 B2 | 3/2004 | Taylor et al. |
| 5,893,977 A | 4/1999 | Pucci | | 6,735,830 B1 | 5/2004 | Merciel |
| 5,911,957 A | 6/1999 | Khatchatrian et al. | | 6,749,667 B2 | 6/2004 | Reeves et al. |
| 5,972,076 A | 10/1999 | Nichols et al. | | 6,753,652 B2 | 6/2004 | Kim |
| 5,975,090 A | 11/1999 | Taylor et al. | | 6,761,796 B2 | 7/2004 | Srivastava et al. |
| 5,980,614 A | 11/1999 | Loreth et al. | | 6,768,108 B2 | 7/2004 | Hirano et al. |
| 5,993,521 A | 11/1999 | Loreth et al. | | 6,768,110 B2 | 7/2004 | Alani |
| 5,993,738 A | 11/1999 | Goswani | | 6,768,120 B2 | 7/2004 | Leung et al. |
| 5,997,619 A | 12/1999 | Knuth et al. | | 6,768,121 B2 | 7/2004 | Horskey |
| 6,019,815 A | 2/2000 | Satyapal et al. | | 6,770,878 B2 | 8/2004 | Uhlemann et al. |
| 6,042,637 A | 3/2000 | Weinberg | | 6,774,359 B1 | 8/2004 | Hirabayashi et al. |
| 6,063,168 A | 5/2000 | Nichols et al. | | 6,777,686 B2 | 8/2004 | Olson et al. |
| 6,086,657 A | 7/2000 | Freije | | 6,777,699 B1 | 8/2004 | Miley et al. |
| 6,090,189 A | 7/2000 | Wikström et al. | | 6,777,882 B2 | 8/2004 | Goldberg et al. |
| 6,117,216 A | 9/2000 | Loreth | | 6,781,136 B1 | 8/2004 | Kato |
| 6,118,645 A | 9/2000 | Partridge | | 6,785,912 B1 | 9/2004 | Julio |
| 6,126,722 A | 10/2000 | Mitchell et al. | | 6,791,814 B2 | 9/2004 | Adachi et al. |
| 6,126,727 A | 10/2000 | Lo | | 6,794,661 B2 | 9/2004 | Tsukihara et al. |
| 6,149,717 A | 11/2000 | Satyapal et al. | | 6,797,339 B2 | 9/2004 | Akizuki et al. |
| 6,149,815 A | 11/2000 | Sauter | | 6,797,964 B2 | 9/2004 | Yamashita |
| 6,152,146 A | 11/2000 | Taylor et al. | | 6,799,068 B1 | 9/2004 | Hartmann et al. |
| 6,163,098 A | 12/2000 | Taylor et al. | | 6,800,862 B2 | 10/2004 | Matsumoto et al. |
| 6,176,977 B1 | 1/2001 | Taylor et al. | | 6,803,585 B2 | 10/2004 | Glukhoy |
| 5,484,472 C1 | 2/2001 | Weinberg | | 6,805,916 B2 | 10/2004 | Cadieu |
| 6,182,461 B1 | 2/2001 | Washburn et al. | | 6,806,035 B1 | 10/2004 | Atireklapvarodom et al. |
| 6,182,671 B1 | 2/2001 | Taylor et al. | | 6,806,163 B2 | 10/2004 | Wu et al. |
| 6,187,271 B1 | 2/2001 | Lee et al. | | 6,806,468 B2 | 10/2004 | Laiko et al. |
| 6,193,852 B1 | 2/2001 | Caracciolo et al. | | 6,808,606 B2 | 10/2004 | Thomsen et al. |
| 6,203,600 B1 | 3/2001 | Loreth | | 6,809,310 B2 | 10/2004 | Chen |
| 6,212,883 B1 | 4/2001 | Kang | | 6,809,312 B1 | 10/2004 | Park et al. |
| 6,228,149 B1 | 5/2001 | Alenichev et al. | | 6,809,325 B2 | 10/2004 | Dahl et al. |
| 6,251,171 B1 | 6/2001 | Marra et al. | | 6,812,647 B2 | 11/2004 | Cornelius |
| 6,252,012 B1 | 6/2001 | Egitto et al. | | 6,815,690 B2 | 11/2004 | Veerasamy et al. |
| 6,270,733 B1 | 8/2001 | Rodden | | 6,818,257 B2 | 11/2004 | Amann et al. |
| 6,277,248 B1 | 8/2001 | Ishioka et al. | | 6,818,909 B2 | 11/2004 | Murrell et al. |
| 6,282,106 B2 | 8/2001 | Grass | | 6,819,053 B2 | 11/2004 | Johnson |
| D449,097 S | 10/2001 | Smith et al. | | 6,863,869 B2 | 3/2005 | Lau |
| D449,679 S | 10/2001 | Smith et al. | | 6,893,618 B2 | 5/2005 | Kotlyar et al. |

| | | | | | |
|---|---|---|---|---|---|
| 6,897,617 B2 | 5/2005 | Lee | CN | 2138764 Y | 6/1993 |
| 6,899,745 B2 | 5/2005 | Gatchell et al. | CN | 2153231 Y | 12/1993 |
| 6,908,501 B2 | 6/2005 | Reeves et al. | CN | 2174002 | 8/1994 |
| 6,958,134 B2 | 10/2005 | Taylor et al. | DE | 2206057 | 8/1973 |
| 6,974,560 B2 * | 12/2005 | Taylor et al. ........... 422/186.04 | DE | 197 41 621 C 1 | 6/1999 |
| 6,984,987 B2 | 1/2006 | Taylor et al. | EP | 0433152 A1 | 12/1990 |
| 2001/0048906 A1 | 12/2001 | Lau et al. | EP | 0332624 B1 | 1/1992 |
| 2002/0069760 A1 | 6/2002 | Pruette et al. | FR | 2690509 | 10/1993 |
| 2002/0079212 A1 | 6/2002 | Taylor et al. | GB | 643363 | 9/1950 |
| 2002/0098131 A1 | 7/2002 | Taylor et al. | JP | S51-90077 | 8/1976 |
| 2002/0122751 A1 | 9/2002 | Sinaiko et al. | JP | S62-20653 | 2/1987 |
| 2002/0122752 A1 | 9/2002 | Taylor et al. | JP | S63-164948 | 10/1988 |
| 2002/0127156 A1 | 9/2002 | Taylor | JP | 10137007 | 5/1998 |
| 2002/0134664 A1 | 9/2002 | Taylor et al. | JP | 11104223 | 4/1999 |
| 2002/0134665 A1 | 9/2002 | Taylor et al. | JP | 2000236914 | 9/2000 |
| 2002/0141914 A1 | 10/2002 | Lau et al. | WO | WO 92/05875 A1 | 4/1992 |
| 2002/0144601 A1 | 10/2002 | Palestro et al. | WO | WO 96/04703 A1 | 2/1996 |
| 2002/0146356 A1 | 10/2002 | Sinaiko et al. | WO | WO 99/07474 A1 | 2/1999 |
| 2002/0150520 A1 | 10/2002 | Taylor et al. | WO | WO00/10713 A1 | 3/2000 |
| 2002/0152890 A1 | 10/2002 | Leiser | WO | WO01/47803 A1 | 7/2001 |
| 2002/0155041 A1 | 10/2002 | McKinney, Jr. et al. | WO | WO01/48781 A1 | 7/2001 |
| 2002/0170435 A1 | 11/2002 | Joannou | WO | WO01/64349 A1 | 9/2001 |
| 2002/0190658 A1 | 12/2002 | Lee | WO | WO01/85348 A2 | 11/2001 |
| 2002/0195951 A1 | 12/2002 | Lee | WO | WO02/20162 A2 | 3/2002 |
| 2003/0005824 A1 | 1/2003 | Katou et al. | WO | WO02/20163 A2 | 3/2002 |
| 2003/0165040 A1 * | 9/2003 | Posadas ..................... 361/213 | WO | WO02/30574 A1 | 4/2002 |
| 2003/0170150 A1 | 9/2003 | Law et al. | WO | WO02/32578 A1 | 4/2002 |
| 2003/0206837 A1 | 11/2003 | Taylor et al. | WO | WO02/42003 A1 | 5/2002 |
| 2003/0206839 A1 | 11/2003 | Taylor et al. | WO | WO02/066167 A1 | 8/2002 |
| 2003/0206840 A1 | 11/2003 | Taylor et al. | WO | WO03/009944 A1 | 2/2003 |
| 2004/0033176 A1 | 2/2004 | Lee et al. | WO | WO03/013620 A1 | 2/2003 |
| 2004/0052700 A1 | 3/2004 | Kotlyar et al. | | | |
| 2004/0065202 A1 | 4/2004 | Gatchell et al. | | | |
| 2004/0096376 A1 | 5/2004 | Taylor | | | |
| 2004/0136863 A1 | 7/2004 | Yates et al. | | | |
| 2004/0166037 A1 | 8/2004 | Youdell et al. | | | |
| 2004/0226447 A1 | 11/2004 | Lau et al. | | | |
| 2004/0234431 A1 | 11/2004 | Taylor et al. | | | |
| 2004/0251124 A1 | 12/2004 | Lau | | | |
| 2005/0000793 A1 | 1/2005 | Taylor et al. | | | |

FOREIGN PATENT DOCUMENTS

| | | |
|---|---|---|
| CN | 87210843 U | 7/1988 |

OTHER PUBLICATIONS

"Zenion Elf Device," drawing, prior art.

Electrical schematic and promotional material available from Zenion Industries, 7 pages, Aug. 1990.

Promotional material available from Zenion Industries for the Plasma-Pure 100/200/300, 2 pages, Aug. 1990.

Promotional material available from Zenion Industries for the Plasma-Tron, 2 pages, Aug. 1990.

LENTEK Silā™ Plug-In Air Purifier/Deodorizer product box copyrighted 1999, 13 pages.

* cited by examiner

AIR TREATMENT DEVICE HAVING A SENSOR

CLAIM OF PRIORITY

This application claims priority to U.S. Provisional Application No. 60/461,734, filed Apr. 9, 2003.

This application relates to the following co-owned and co-pending applications:
U.S. patent application Ser. No. 90/007,276, filed Oct. 29, 2004, U.S. patent application Ser. No. 11/041,926, filed Jan. 21, 2005, U.S. patent application Ser. No. 11/091,243, filed Mar. 28, 2005, U.S. patent application Ser. No. 11/062,057, filed Feb. 18, 2005, U.S. patent application Ser. No. 11/071,779, filed Mar. 3, 2005, U.S. patent application Ser. No. 10/994,869, filed Nov. 22, 2004, U.S. patent application Ser. No. 11/007,556, filed Dec. 8, 2004, U.S. patent application Ser. No. 10/074,209, filed Feb. 12, 2002, U.S. patent application Ser. No. 10/685,182, filed Oct. 14, 2003, U.S. patent application Ser. No. 10/944,016, filed Sep. 17, 2004, U.S. patent application Ser. No. 10/795,934, filed Mar. 8, 2004, U.S. patent application Ser. No. 10/435,289, filed May 9, 2003, U.S. patent application Ser. No. 11/064,797, filed Feb. 24, 2005, U.S. patent application Ser. No. 11/003,671, filed Dec. 3, 2004, U.S. patent application Ser. No. 11/003,035, filed Dec. 3, 2004, U.S. patent application Ser. No. 11/007,395, filed Dec. 8, 2004, U.S. patent application Ser. No. 10/876,495, filed Jun. 25, 2004, U.S. patent application Ser. No. 10/809,923, filed Mar. 25, 2004, U.S. patent application Ser. No. 11/004,397, filed Dec. 3, 2004, U.S. patent application Ser. No. 10/895,799, filed Jul. 21, 2004, U.S. patent application Ser. No. 10/642,927, filed Aug. 18, 2003, U.S. patent application Ser. No. 11/823,346, filed Apr. 12, 2004, U.S. patent application Ser. No. 10/662,591, filed Sep. 15, 2003, U.S. patent application Ser. No. 11/061,967, filed Feb. 18, 2005, U.S. patent application Ser. No. 11/150,046, filed Jun. 10, 2005, U.S. patent application Ser. No. 11/188,448, filed Jul. 25, 2005, U.S. patent application Ser. No. 11/188,478, filed Jul. 25, 2005, U.S. patent application Ser. No. 11/293,538, filed Dec. 2, 2005, U.S. patent application Ser. No. 11/457,396, filed Jul. 13, 2006, U.S. patent application Ser. No. 11/464,139, filed Aug. 11, 2006.

FIELD OF THE INVENTION

The present invention relates generally to devices that produce an electro-kinetic flow of air from which particulate matter is removed.

BACKGROUND OF THE INVENTION

The use of an electric motor to rotate a fan blade to create an airflow has long been known in the art. Unfortunately, such fans produce substantial noise, and can present a hazard to children who may be tempted to poke a finger or a pencil into the moving fan blade. Although such fans can produce substantial airflow (e.g., 1,000 ft³/minute or more), substantial electrical power is required to operate the motor, and essentially no conditioning of the flowing air occurs.

It is known to provide such fans with a HEPA-compliant filter element to remove particulate matter larger than perhaps 0.3 μm. Unfortunately, the resistance to airflow presented by the filter element may require doubling the electric motor size to maintain a desired level of airflow. Further, HEPA-compliant filter elements are expensive, and can represent a substantial portion of the sale price of a HEPA-compliant filter-fan unit. While such filter-fan units can condition the air by removing large particles, particulate matter small enough to pass through the filter element is not removed, including bacteria, for example.

It is also known in the art to produce an airflow using electro-kinetic technique, by which electrical power is converted into a flow of air without mechanically moving components. One such system is described in U.S. Pat. No. 4,789,801 to Lee (1988), which patent is incorporated herein by reference. An array of first ("emitter") electrodes or conductive surfaces are spaced-apart symmetrically from an array of second ("collector") electrodes or conductive surfaces. The positive terminal of a generator such as, for example, pulse generator that outputs a train of high voltage pulses (e.g., 0 to perhaps +5 KV) is coupled to the first array, and the negative pulse generator terminal is coupled to the second array in this example. It is to be understood that the arrays depicted include multiple electrodes, but that an array can include or be replaced by a single electrode.

The high voltage pulses ionize the air between the arrays, and create an airflow from the first array toward the second array, without requiring any moving parts. Particulate matter in the air is entrained within the airflow and also moves towards the second electrodes. Much of the particulate matter is electrostatically attracted to the surfaces of the second electrodes, where it remains, thus conditioning the flow of air exiting system. Further, the high voltage field present between the electrode arrays can release ozone into the ambient environment, which can eliminate odors that are entrained in the airflow.

While the electrostatic techniques disclosed by the '801 patent are advantageous over conventional electric fan-filter units, further increased air transport-conditioning efficiency would be advantageous.

SUMMARY OF THE INVENTION

One embodiment of the present invention is a system including a first and a second electrode and a voltage generator. The voltage generator is coupled to the first and second electrodes in order to create a flow of air in a downstream direction from the first electrode to the second electrode. The system includes an environmental sensor. The output of a voltage generator is adjusted based on a signal from the sensor.

The environmental sensor allows the system to react to the changes in the environment. In one embodiment, the environment sensor is a particulate sensor. The use of a particulate sensor allows the system to adjust the output of the voltage generator in response to a changing level of particulate in the air. For example, the voltage peak or duty cycle of the output of the voltage generator can be increased when a high level of particulate is detected.

In one embodiment, the environmental sensor is an ozone detector. The ozone detector can be used to ensure that the ozone output of the air transporter-conditioner is below a pre-set maximum. In this way, the air transporter-conditioner can be run at a high level while insuring that the ozone level is not excessive.

In one embodiment, the environmental sensor is a passive infrared detector. The detector can be used for detecting the presence of people or animals. When people or animals are present in a room, they tend to produce or stir up particulate. When people or animals are detected, the unit can be turned on or the output of the voltage generator increased.

In one embodiment, the environmental sensor is located on a remote unit. The remote unit can communicate with the base unit to control the output of the voltage generator.

Other objects, aspects, features and advantages of the invention will appear from the following description in which the preferred embodiments have been set forth in detail, in conjunction with the accompanying drawings and also from the following claims.

DETAILED DESCRIPTION OF THE PREFERRED EMBODIMENTS

Figure 1A:
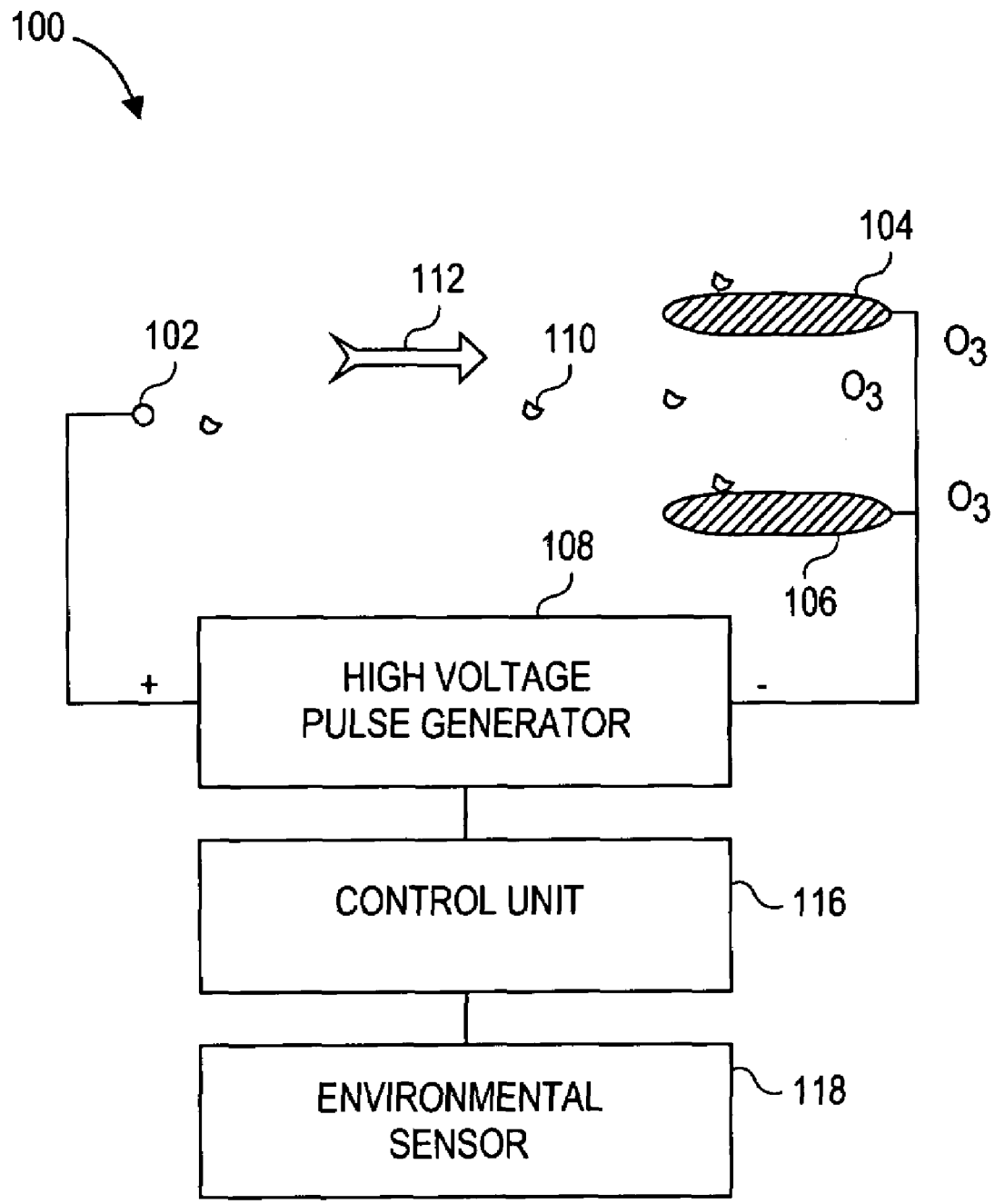
FIG. 1A is a diagram illustrating an air transporter-conditioner of one embodiment of the present invention using an environmental sensor.

FIG. 1A illustrates a system 100 including first electrode 102 and second electrodes 104 and 106. In this example, a single first electrode 102 and multiple second electrodes 102 and 104 are used. However, any number of first and second electrodes can be used. A high voltage air transporter-conditioner unit 108 is used to produce pulses on the voltage to the first electrodes 102. The high voltage pulse generator can be operably connected to the second electrodes 104 and 106. The high voltage pulse ionizes the air and the ions flow between the first electrode 102 and the second electrode 104 and 106. Particulate matter 110 is entrained in the air flow 112 and flows toward the second electrodes 104 and 106. Particulate is electrostatically connected to the surface of the second electrodes 104 and 106, thus conditioning the flow of air exiting the system 100. The high voltage field of the first electrode can release ozone into the environment which can eliminate odors entrained in the air flow.

The air flow 112 and the ozone production are related to the voltage which is produced by the high voltage pulse generator of 108. One embodiment, the control unit 116 controls the high voltage pulse generator 108 to produce a desired output. The voltage output can be modified in the peak voltage, frequency or duty cycle. In one embodiment, the duty cycle or peak voltage is modified.

In one embodiment the control unit 116 can be an Application Specific Integrated Circuit (ASIC), a Field Programmable Gate Array (FPGA) logic, or a processor. The control unit 116 uses a signal from the environmental sensor 118 to control the operation of the high voltage pulse generator. The control unit 116 can also receive signals from switches or other indications to determine when to turn on the system, and when to set the system to high or another value indicated by external switch selections.

A preset pattern for the output of the high voltage generator can be used. For example, a heavy duty cycle can be used for a few seconds followed by a lighter duty cycle afterwards. The control unit 116 can modify or select the preset pattern based on signals from the environmental sensor 118.

The environmental sensor 118 is any sensor or detector that produces an indication of an environmental condition. The environmental sensor 118 can be a particulate sensor, which can indicate the particulate level in the air. The environmental sensor can be an ozone detector, detecting the level of the ozone in the air. In one embodiment, the environmental conditioner 118 is a passive IR sensor detector, detecting the presence of humans or animals in the room.

One or more environmental sensors can be connected to the control unit 116 to control the output of the high voltage pulse generator. In one embodiment, the control unit 116 interrupts the output signals from the environmental sensor 118, to determine how to modify the output of the high voltage generator 108.

The particulate detector or other sensors can be positioned within the air flow produced between the electrodes or at other locations in or out of the base unit.

Figure 1B:
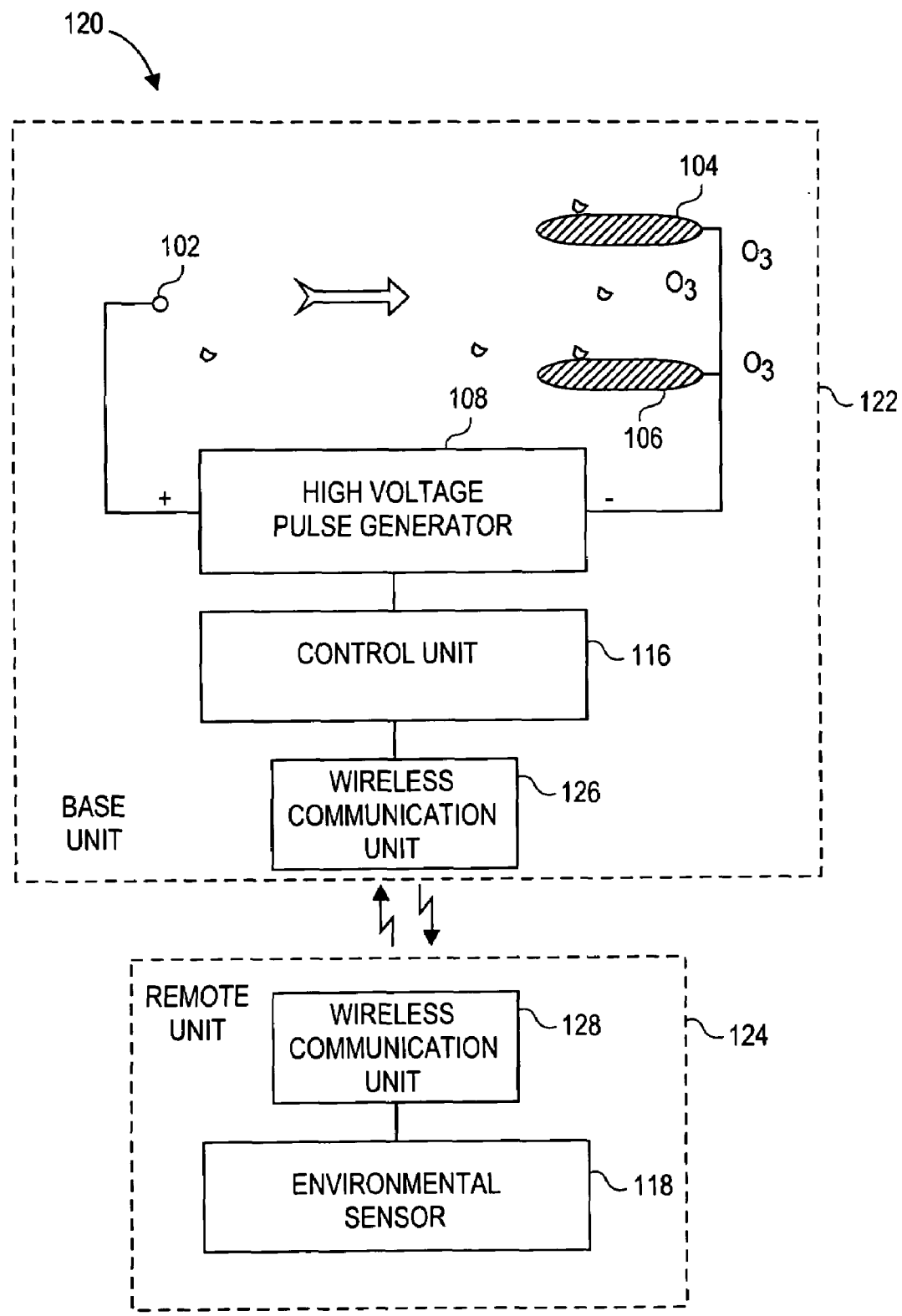
FIG. 1B is a diagram of an air transporter conditioner of one embodiment of the present invention in which an environmental sensor is located on a remote unit.

FIG. 1B illustrates a system 120 comprising a base unit 122 and a remote unit 124. The base unit 122 includes the first electrode 102, second electrodes 104 and 106, high voltage pulse generator 108 and control unit 116. In one embodiment all or a portion of the control units 106 could be located at the remote unit 124. In the example of FIG. 1B, the base unit 122 includes a wireless communication unit 126 which communicates with a wireless communication unit 128 on the remote unit 124. The remote unit 124 also includes the environmental sensor 118. In this embodiment, the remote unit 124 then be positioned at a different locations within the room and the wireless unit can communicate with the base unit 122. Remote unit 124 can have a wired or wireless connection to the base unit 122.

Figure 2A:
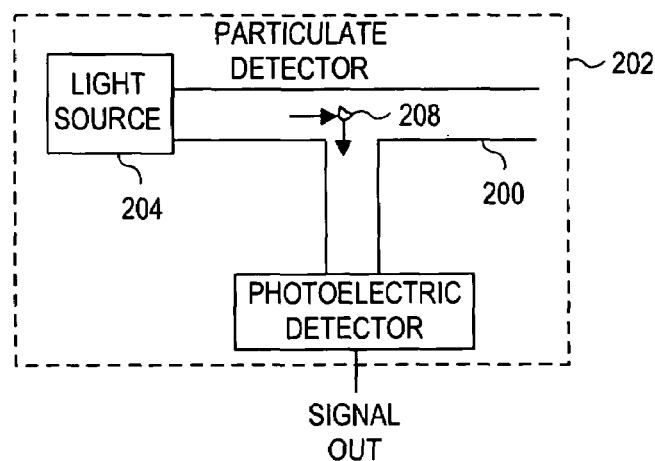
FIG. 2A is a diagram of a particulate detector which can be used in one embodiment of the present invention.
Figure 2B:
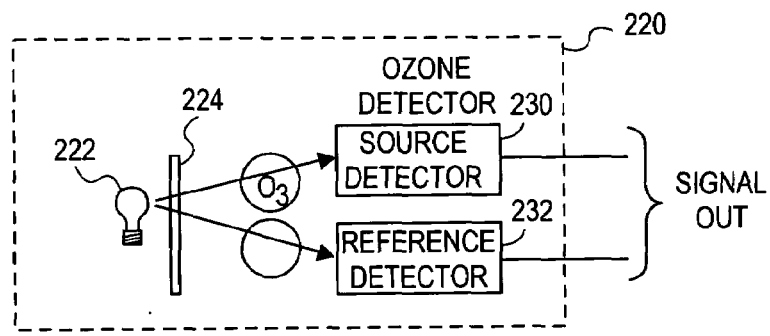
FIG. 2B is a diagram of an ozone detector which is used in one embodiment of the present invention.
Figure 2C:
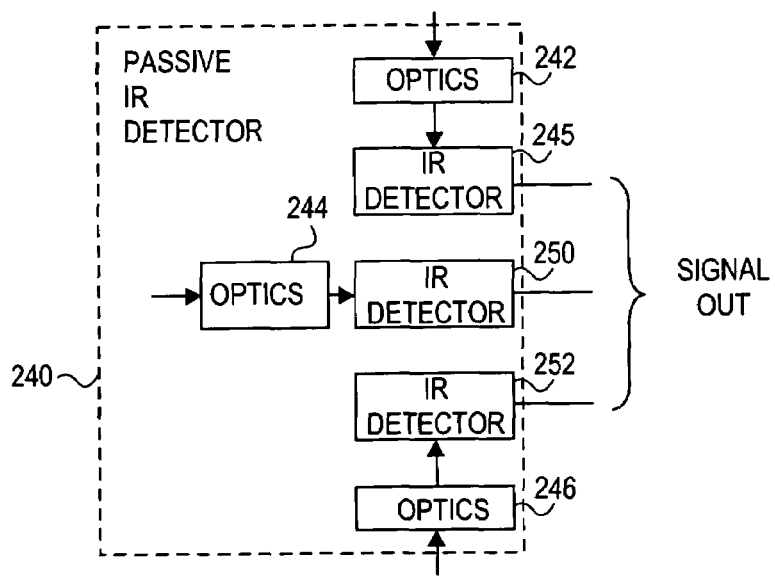
FIG. 2C is a diagram of a passive infrared detector which is used in one embodiment of the present invention.

FIGS. 2A-2C illustrates environmental sensors of one embodiment of the present invention. FIG. 2A illustrates a particulate detector 102 of one embodiment of the present invention. The optical particulate detector can be a nephelometer or other type of photo-electric device. In the FIG. 2A example, a light source 204 is positioned within a tube 206. Light from the light source 204 reflects off the particulate 208 and reaches a photo electric detector 210. The more particulate, the more reflected light and thus the greater the detected signal. In an alternate embodiment, the light source can be in-line with the photo-electric detector.

The light source 204 can be of any type including photo-diodes. The photo-electric detector 210 produces a signal which can be interpreted to indicate the particulate level. As described above, a signal from the particulate detector can be used by the control unit to set the voltage output of the high voltage pulse generator.

FIG. 2B illustrates an example of an ozone detector 220. The ozone detector uses the light source 222 which is sent to an optional optical filter 224. The lamp 222 and optional optical filter 224 are designed so the light output is a highly absorbed by ozone. A portion of the light goes through tube 226 which contains the air to be tested. Another portion of the light that goes thorough a reference tube 228 which contains an air sample without ozone. The output of the source detector 230 and the reference detector 232 can be used to calculate the concentration of ozone. In one embodiment, the output of the lamp 222 and optional filter 224 is at the 254 nm wavelength using absorption. The Beer-Lambert equation can be used to determine the concentration of ozone in the tube 226. Temperature and pressure are variables in the Beer-Lambert equation. If the temperature and pressure can vary significantly, sensors for temperature and pressure can be used. Other ozone detector designs can be used as well.

FIG. 2C illustrates a passive infrared (IR) detector 240. The passive IR detector of FIG. 2C uses optics 242, 244 and 246 which focus infrared radiation to the IR detectors 248, 250 and 252. The use of the passive IR detector 240 allows for the determination of humans or other animal in the room. The passive IR detectors are typically set up to detect spikes in the received IR radiation consistent with a person or animal moving into focus of the passive IR detector.

Figure 3:
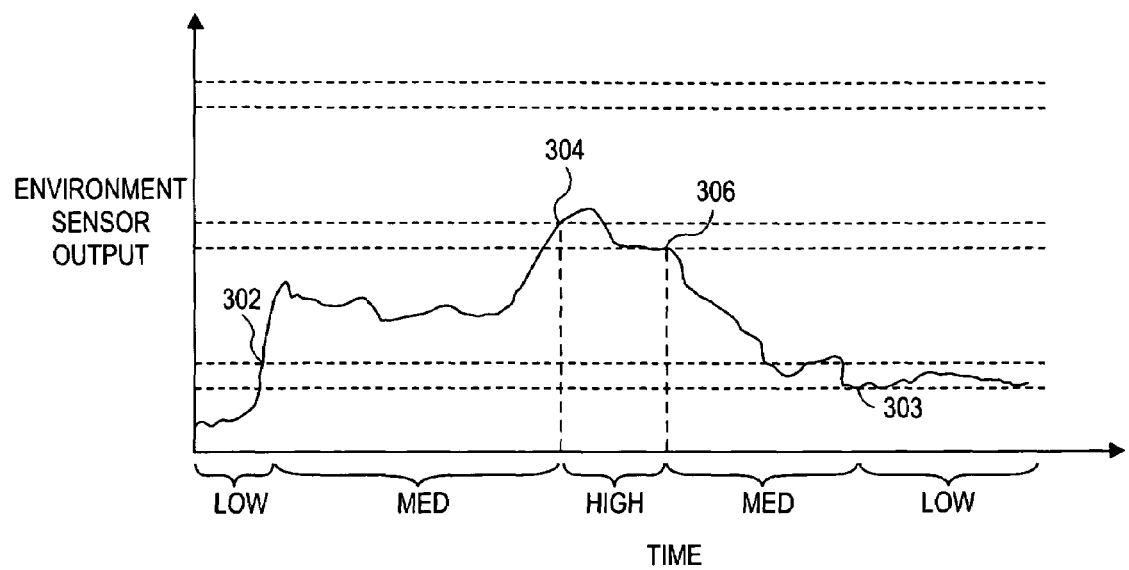
FIG. 3 is an exemplary graph of an environmental sensor output of one embodiment of the present invention.

FIG. 3 illustrates an example of the selection of output of the voltage generator based on an environmental sensor output. In this example, the environmental sensor output is a particulate detector output. This example shows the operation using multiple modes. With very clean air, the system will operate in a low mode. Moderately dirty air can result in a medium mode operation. Dirty air can result in a high mode. Extremely dirty air may trigger a boost mode for limited periods. FIG. 3 shows an example in which hysteresis is used for transitions between the low, medium, high and boost modes. In example of FIG. 3, at point 320, the system transitions between a low mode and medium mode, at point 304, the system transitions between the medium mode and a high mode. At point 306, the system transitions between the high mode and the medium mode at point 308, the system transitions between the medium and low mode. In this example, the boost mode is not entered because the particulate level is not sufficiently high.

Figure 4A:
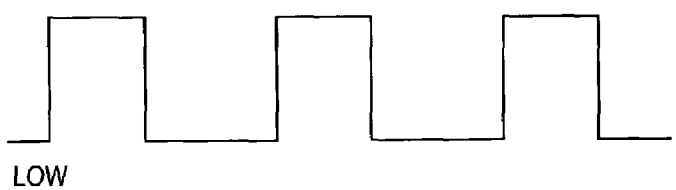
FIG. 4A-4C are diagrams of exemplary high voltage generator output of one embodiment of the present invention.
Figure 4B:
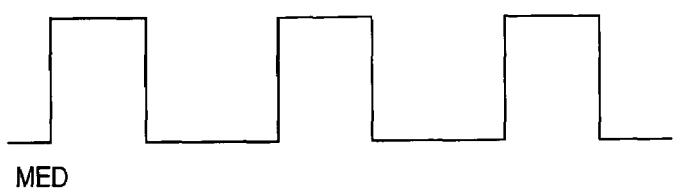
Figure 4C:
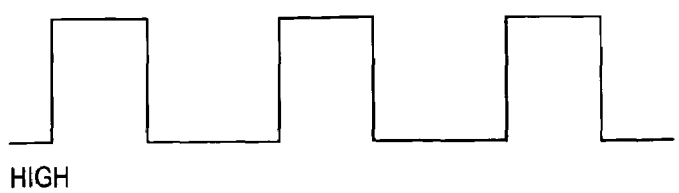

FIGS. 4A-4C illustrates examples of voltage generator outputs for different modes. In this example, the duty cycle of the voltage sensor output for the medium mode is greater than for the low mode and the duty cycle of the voltage generator output for the high mode is greater than for the medium mode. In this way, there will be an increased amount of air flow, particulate collection, and of ozone production when a greater level of particulate is detected. Although, FIGS. 3 and 4A-4C illustrate a system using fixed voltage generator outputs, in one embodiment, the output gradually changes based upon the sensor signal.

Figure 5:
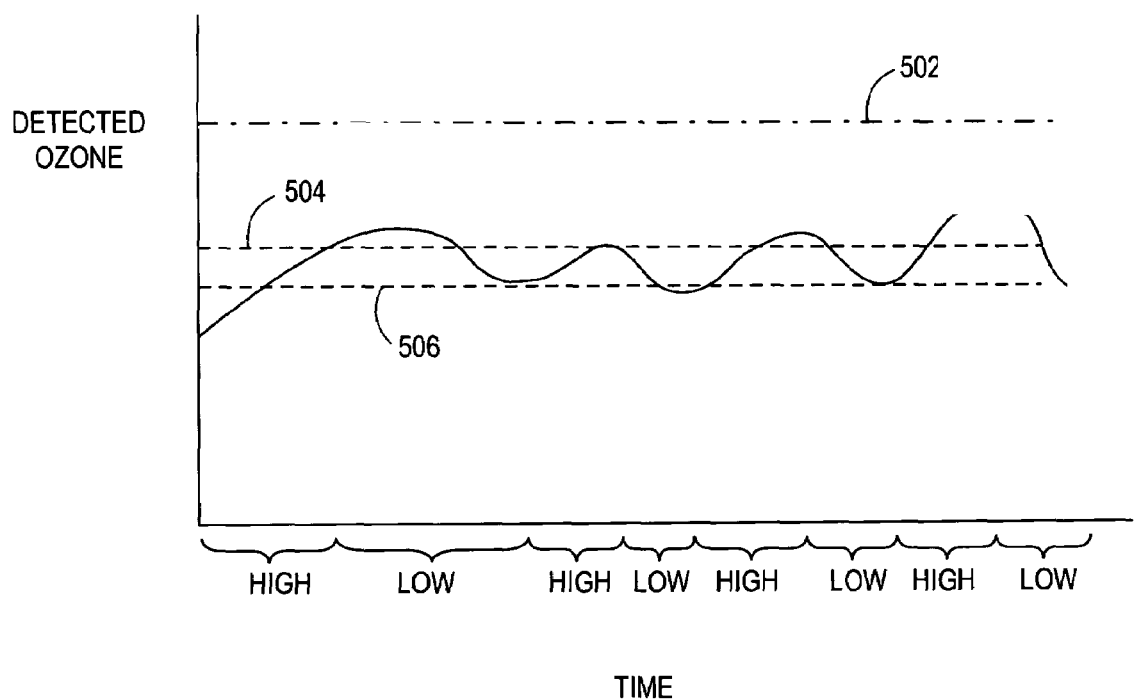
FIG. 5 is an exemplary graph of detected ozone for one embodiment of the system of the present invention.

FIG. 5 illustrates a graph of the detected ozone level. In this example, line 502 represents the maximum amount of ozone desirable. In one embodiment, the maximum level is 50 parts per billion. In this example, the predetermined levels 504 and 506 are used for transitioning between a high and low output. When the ozone level goes above line 504, the system switches to a low output. When the ozone level goes below level 506, the system switches to a high output. In this way, the ozone production can be kept below a level. Other control methods using the detected ozone level can also be used.

Figure 6:
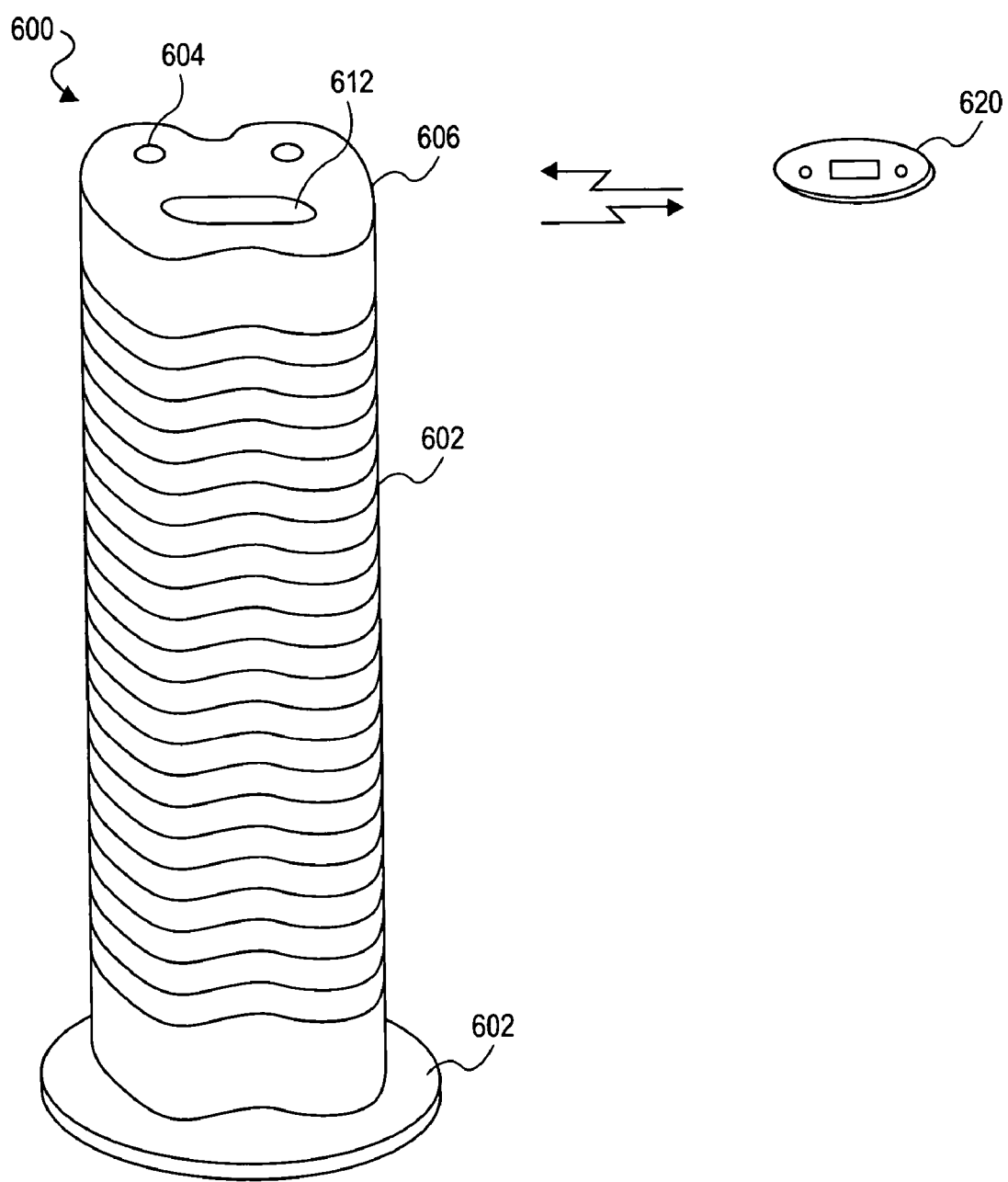
FIG. 6 is a diagram of free standing air transporter-conditioner of one embodiment of the present invention.

FIG. 6 depicts an electro-kinetic air transporter-conditioner system 600 of one embodiment. The electrokinetic air transporter conditioner system 600 includes a housing 602 including rear-located intake vents or louvers, front located exhaust vents, and a base pedestal 602. If desired, a single vent can provide and be used as both an air intake and an air exhaust with an air inlet channel and an air exhaust channel communicating with the vent and the electrodes. The housing can be freestanding and/or upstandingly vertical and/or elongated. Internal to the transporter housing is an ion generating unit. The ion generating unit can be powered by an AC/DC power supply that is energizable or excitable using a switch 604. Switch 604 which along with the other user operated switches are conveniently located at the top 606 of the unit 600. The ion generating unit is self-contained in that other than ambient air, nothing is required from beyond the transporter housing, save external operating potential, for operation of the present invention.

The upper surface of housing 602 includes a user-liftable handle member 612 to which is affixed an array 240 of second electrodes within an electrode assembly. Electrode assembly also comprises a first array of emitter electrodes, or a single first electrode. The first electrode can be a wire or wire shaped electrode. (The terms "wire" and "wire-shaped" are used interchangeably herein to mean an electrode either made from a wire or, if thicker or stiffer than a wire, having the appearance of a wire.) In the embodiment shown, lifting member lifts second array electrodes upward, causing the second electrode to telescope out of the top of the housing and, if desired, out of unit 600 for cleaning, while the first electrode on the first electrode array remains within unit 600. The second array of an electrode can be lifted vertically out from the top 606 of unit 600 along the longitudinal axis or direction of the elongated housing 602. This arrangement with the second electrodes removable from the top 606 of the unit 600, makes it easy for the user to pull the second electrodes out for cleaning. The bottom ends of second electrodes can be connected to a member, to which is attached a mechanism, which includes a flexible member and a slot for capturing and cleaning the first electrode, whenever handle member 612 is moved upward or downward by a user.

The general shape of the embodiment shown in FIG. 6, is that of a figure eight in cross-section, although other shapes are within the spirit and scope of the invention. The top-to-bottom height of one embodiment is, 1 m, with a left-to-right width of 15 cm, and a front-to-back depth of perhaps 10 cm, although other dimensions and shapes can of course be used. A louvered construction provides ample inlet and outlet venting in an economical housing configuration. There need be no real distinction between the input and output vents, except their location relative to the second electrodes. These vents serve to ensure that an adequate flow of ambient air can be drawn into or made available to the unit 600, and that an adequate flow of ionized air that includes appropriate amounts of $O_3$ flows out from unit 600.

When unit 600 is turned on, high voltage or high potential output by ion generator produces ions at the first electrode, which ions are attracted to the second electrodes. The movement of the ions carries with the ions air molecules, thus electro-kinetically producing an outflow of ionized air. The intake of ambient air contains particulate matter. The outflow is cleaned air with a reduction of the particulate matter. The particulate matter adhering electrostatically to the surface of the second electrodes. In the process of generating the ionized airflow, appropriate amounts of ozone ($O_3$) are beneficially produced. It may be desired to provide the inner surface of housing 602 with an electrostatic shield to reduce detectable electromagnetic radiation. For example, a metal shield could be disposed within the housing, or portions of the interior of the housing can be coated with a metallic paint to reduce such radiation.

The housing can have a substantially oval-shaped or-elliptically shaped cross-section with dimpled side grooves. Thus, as indicated above, the cross-section looks somewhat like a figure eight. It is within the scope of the present invention for the housing to have a different shaped cross-section such as, but not limited to, a rectangular shape, an egg shape, a tear-drop shape, or circular shape. The housing has a tall, thin configuration. As will become apparent later, the housing is functionally shaped to contain the electrode assembly.

As mentioned above, the housing of this example has an inlet and an outlet. Both the inlet and the outlet are covered by fins or louvers. Each fin is a thin ridge spaced-apart from the next fin, so that each fin creates minimal resistance as air flows through the housing. The fins are horizontal and are directed across the elongated vertical upstanding housing of the unit. Thus, the fins are substantially perpendicular to the electrodes in one embodiment. The inlet and outlet fins are aligned to give the unit a "see through" appearance. Thus, a user can "see through" the unit from the inlet to the outlet. The user will see no moving parts within the housing, but just a quiet unit that cleans the air passing there through. Alternatively the fins can be parallel with the electrodes in another embodiment. Other orientations of fins and electrodes are possible in other embodiments.

The remote unit 620 can contain an environmental sensor detecting a feature in the environment. The remote unit 620 wirelessly communicates with the unit 600. The remote unit 620 can also include a display as well as additional controls for turning on or modifying the output of the system 600.

Figure 7:
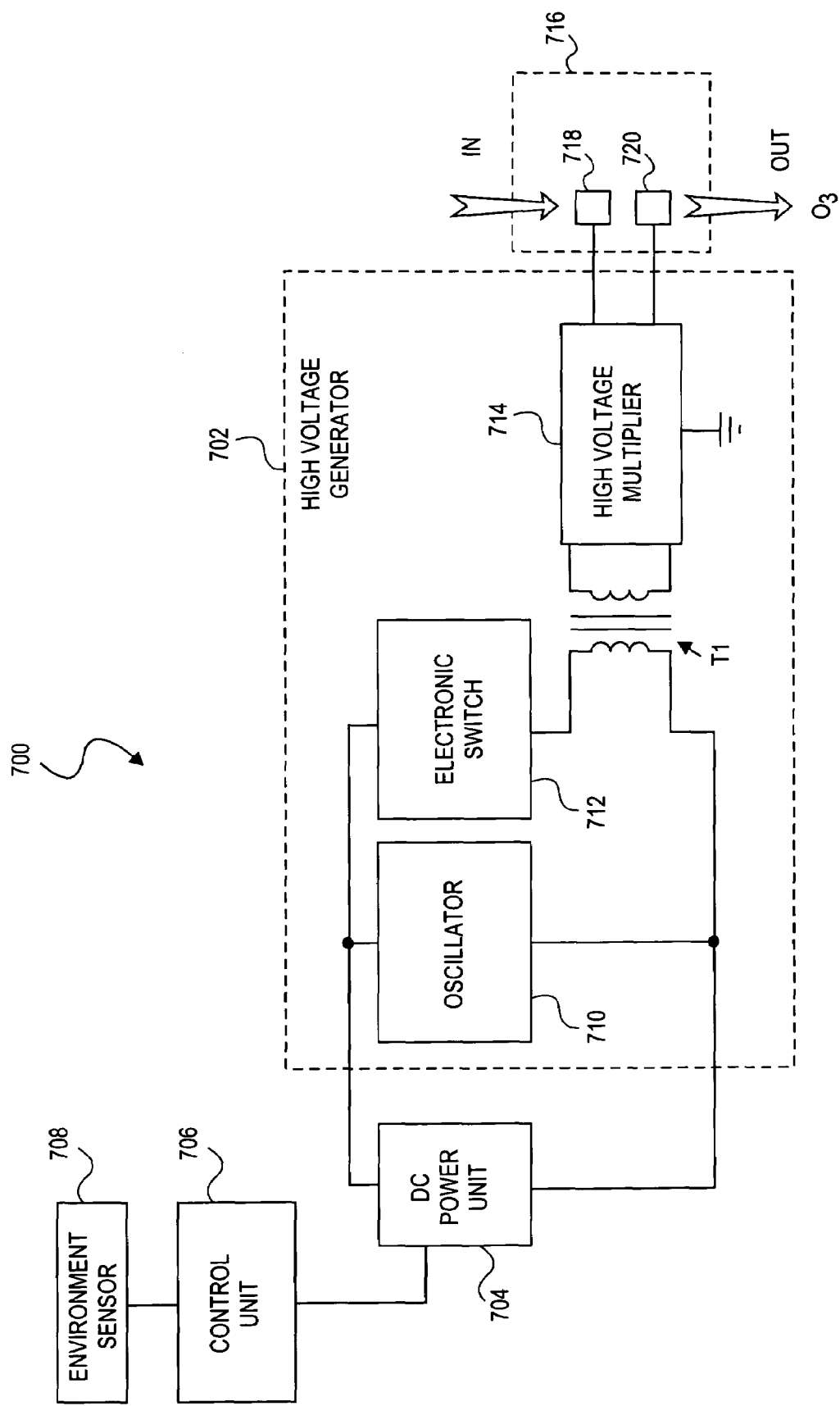
FIG. 7 is a diagram which illustrates one embodiment of the system of the present invention.

FIG. 7 shows an ion generating unit 700 includes a high voltage generator unit 702 and a DC Power unit 704 for providing DC power to the high voltage generator 702. In one embodiment, the DC power unit 704 is an AC/DC converter, for converting raw alternating voltage (e.g., 117 VAC) into direct current ("DC") voltage. The DC power unit 704 can also be a battery unit. Control unit 706 can include circuitry controlling the shape and/or duty cycle of the generator unit output voltage. The control unit 706 can use signals from the environment sensor 708 to control the shape and/or duty cycle. Control unit 706 can also include a pulse mode component, coupled to a user switch, to temporarily provide a burst of increased output ozone. Control unit 704 can also include a timer circuit and a visual indicator such as a light emitting diode ("LED"). The LED or other indicator (including, if desired, an audible indicator) signals when ion generation quits occurring. The timer can automatically halt generation of ions and/or ozone after some predetermined time, e.g., 30 minutes.

The high voltage generator unit 702 can comprise a low voltage oscillator circuit 710 of perhaps 20 KHz frequency, that outputs low voltage pulses to an electronic switch 712, e.g., a thyristor or the like. Switch 712 switchable couples the low voltage pulses to the input winding of a step-up transformer T1. The secondary winding of T1 is coupled to a high voltage multiplier circuit 714 that outputs high voltage pulses. The circuitry and components can comprise a high voltage pulse generator 702 and DC power unit 704 are fabricated on a printed circuit board that is mounted within a housing. If desired, external audio input (e.g., from a stereo tuner) could be suitably coupled to oscillator 710 to acoustically modulate the kinetic airflow produced by unit. The result would be an electrostatic loudspeaker, whose output airflow is audible to the human ear in accordance with the audio input signal. Further, the output air stream would still include ions and ozone.

Output pulses from high voltage generator 702 can be at least 10 KV peak-to-peak with an effective DC offset of, for example, half the peak-to-peak voltage, and have a frequency of, for example, 20 KHz. Frequency of oscillation can include other values, but frequency of at least about 20 KHz is inaudible to humans. If pets will be in the same room as the unit 700, it may be desired to utilize and even higher operating frequency, to prevent pet discomfort and/or howling by the pet.

In one embodiment, the signal from an environmental sensor can be used to select between a low, medium, high and boost pulse train output. The medium pulse train output can have a duty cycle of for example 10%, which will promote battery lifetime if live current is not used. In one embodiment, the low pulse train output has a less than 10% duty factor and the high and boost output pulse train has greater than 10% duty factor. Different peak-peak amplitudes, DC offsets, pulse train waveshapes, duty cycle, and/or repetition frequencies can be used instead. Indeed, a 100% pulse train (e.g., an essentially DC high voltage) may be used, albeit with shorter battery lifetime. Thus, generator unit 702 for this embodiment can be referred to as a high voltage pulse generator. Unit 702 functions as a DC/DC high voltage generator, and could be implemented using other circuitry and/or techniques to output high voltage pulses that are input to electrode assembly 716.

As noted, the air outflow can include appropriate amounts of ozone that can remove odors and destroy or at least substantially alter bacteria, germs, and other living (or quasi-living) matter subjected to the outflow. Thus, when user switch is closed and the generator 702 has sufficient operating potential, pulses from high voltage pulse generator unit 702 create an outflow of ionized air and ozone. When the switch is closed, a LED can visually signal when ionization is occurring.

The operating parameters of unit 700 can be set during manufacture need not be user-adjustable. For example, with respect to operating parameters, increasing the peak-to-peak output voltage and/or duty cycle in the high voltage pulses generated by unit 702 can increase the airflow rate, ion content, and ozone content. In one embodiment, these parameters can be set by the user by adjusting a user switch in addition to automatic changes in parameters in response to the environmental sensor. In one embodiment, for medium mode operation, output flow rate is about 200 feet/minute, ion content is about 2,000,000/cc and ozone content is about 40 ppb (over ambient) to perhaps 2,000 ppb (over ambient). Decreasing the ratio of the radius of the nose of the second electrodes to the radius of the first electrode or decreasing the ratio of the cross-sectioned area of the second electrode to the first electrode below about 20:1 will decrease flow rate, as will decreasing the peak-to-peak voltage and/or duty cycle of the high voltage pulses coupled between the first and second electrode arrays.

In practice, unit 700 is placed in a room and connected to an appropriate source of operating potential, typically 117 VAC. The energizing ionization unit 700, emits ionized air and ozone via outlet vents 106. The airflow, coupled with the ions and ozone freshens the air in the room, and the ozone can beneficially destroy or at least diminish the undesired effects of certain odors, bacteria, germs, and the like. The airflow is indeed electro-kinetically produced, in that there are no intentionally moving parts within unit. (Some mechanical vibration may occur within the electrodes).

In the various embodiments, electrode assembly 716 comprises a first array 718 of at least one electrode or conductive surface, and further comprises a second array 720 of at least one electrode or conductive surface. Material(s) for electrodes, in one embodiment, conduct electricity, are resistant to corrosive effects from the application of high voltage, yet be strong enough to be cleaned.

In the various electrode assemblies to be described herein, electrode(s) 232 in the first electrode array 710 can be fabricated from tungsten. Tungsten is sufficiently robust in order to withstand cleaning, has a high melting point to retard breakdown due to ionization, and has a rough exterior surface that seems to promote efficient ionization. On the other hand, electrode(s) 720 can have a highly polished exterior surface to minimize unwanted point-to-point radiation. As such, electrode(s) 720 can be fabricated from stainless steel and/or brass, among other materials. The polished surface of electrode(s) 718 also promotes ease of electrode cleaning.

The electrodes can be lightweight, easy to fabricate, and lend themselves to mass production. Further, electrodes described herein promote more efficient generation of ionized air, and appropriate amounts of ozone, (indicated in several of the figures as $O_3$).

Embodiments for the electrodes in the system are described in the U.S. patent application Ser. No. 10/074,082; filed Feb. 12, 2002; entitled "Electro-Kinetic Air Transporter-Conditioner Devices with an Upstream Focus Electrode" incorporated herein by reference.

In one embodiment, the positive output terminal of unit 702 is coupled to first electrode array 718, and the negative output terminal is coupled to second electrode array 720. It is believed that with this arrangement the net polarity of the emitted ions is positive, e.g., more positive ions than negative ions are emitted. This coupling polarity has been found to work well, including minimizing unwanted audible electrode vibration or hum. However, while generation of positive ions is conducive to a relatively silent airflow, from a health standpoint, it is desired that the output airflow be richer in negative ions, not positive ions. It is noted that in some embodiments, one port (such as the negative port) of the high voltage pulse generator can in fact be the ambient air. Thus, electrodes in the second array need not be connected to the high voltage pulse generator using a wire. Nonetheless, there will be an "effective connection" between the second array electrodes and one output port of the high voltage pulse generator, in this instance, via ambient air. Alternatively, the negative output terminal of unit 702 can be connected to the first electrode array 718 and the positive output terminal can be connected to the second electrode array 720.

With this arrangement an electrostatic flow of air is created, going from the first electrode array toward the second electrode array.

When voltage or pulses from high voltage pulse generator 702 are coupled across first and second electrode arrays 718 and 720, a plasma-like field is created surrounding electrodes in first array 718. This electric field ionizes the ambient air between the first and second electrode arrays and establishes an "OUT" airflow that moves towards the second array.

Ozone and ions are generated simultaneously by the first array electrodes 718, essentially as a function of the potential from generator 702 coupled to the first array of electrodes or conductive surfaces. Ozone generation can be increased or decreased by increasing or decreasing the potential at the first array. Coupling an opposite polarity potential to the second array electrodes 720 essentially accelerates the motion of ions generated at the first array, producing the out airflow. As the ions and ionized particulate move toward the second array, the ions and ionized particles push or move air molecules toward the second array. The relative velocity of this motion may be increased, by way of example, by decreasing the potential at the second array relative to the potential at the first array.

For example, if +10 KV were applied to the first array electrode(s), and no potential were applied to the second array electrode(s), a cloud of ions (whose net charge is positive) would form adjacent the first electrode array. Further, the relatively high 10 KV potential would generate substantial ozone. By coupling a relatively negative potential to the second array electrode(s), the velocity of the air mass moved by the net emitted ions increases.

On the other hand, if it were desired to maintain the same effective outflow (OUT) velocity, but to generate less ozone, the exemplary 10 KV potential could be divided between the electrode arrays. For example, generator 702 could provide +4 KV (or some other fraction) to the first array electrodes and −6 KV (or some other fraction) to the second array electrodes. In this example, it is understood that the +4 KV and the −6 KV are measured relative to ground. Understandably it is desired that the unit 700 operates to output appropriate amounts of ozone. Accordingly, in one embodiment, the high voltage is fractionalized with about +4 KV applied to the first array electrodes and about −6 KV applied to the second array electrodes. Greater or lesser peak values can be user dependent on signals from environment sensor 708.

In one embodiment, electrode assembly 716 comprises a first array 718 of wire-shaped electrodes, and a second array 720 of generally "U"-shaped electrodes 242. In some embodiments, the number N1 of electrodes comprising the first array can differ by one relative to the number N2 of electrodes comprising the second array 720. In many of the embodiments shown, N2>N1. However, if desired, additional first electrodes could be added at the outer ends of array such that N1>N2, e.g., five first electrodes compared to four second electrodes.

As previously indicated first or emitter electrodes can be lengths of tungsten wire, whereas electrodes are formed from sheet metal, such as stainless steel, although brass or other sheet metal could be used. The sheet metal is readily configured to define side regions and bulbous nose region, forming a hollow, elongated "U"-shaped electrodes.

In one embodiment, the spaced-apart configuration between the first and second arrays is staggered. Each first array electrode can be substantially equidistant from two second array electrodes. This symmetrical staggering has been found to be an efficient electrode placement. The staggering geometry can be symmetrical in that adjacent electrodes or adjacent electrodes are spaced-apart a constant distance, Y1 and Y2 respectively. However, a non-symmetrical configuration could also be used. Also, it is understood that the number of electrodes may differ from what is shown.

In one embodiment ionization occurs as a function of a high voltage electrodes. For example for increasing the peak to peak voltage amplitude and the duty cycle of the pulses form the high voltage pulse generator 720 can increase ozone content in the output flow of ionized air. Another user control switch can be used to somewhat vary the ozone contact for amplitude and/or duty cycle.

In one embodiment, the second electrodes can include a trail electrode pointed region which help produce the output of negative ions. In one embodiment the electrodes of the second array of electrodes is "U" shaped. One embodiment a single pair of "L" shaped electrode(s) in cross section can be additionally used.

In one embodiment, the electrodes assembly has a focus electrode(s). The focus electrodes can produce an enhanced air flow exiting the devices. The focus electrode can have a shape that does not have sharp edges manufactured from a material that will not erode or oxides existing with steel. In one embodiment, the diameter of the focus electrode is 15 times greater than the diameter of the first electrode. The diameter of the focus electrode can be selected such that the focus electrode does not function as an ion generating surface. In one embodiment, the focus electrodes are electrically connected to the first array 718. Focus electrodes help direct the air flow toward the second electrode for guiding it towards particles towards the trailing sides of the second electrode.

The focus electrodes can be "U" or "C" shaped with holes extending there through to minimize the resistance of the focus electrode on the air flow rate. In one embodiment, the electrode 716 has a pin-ring electrode assembly. The pin-ring electrode assembly includes a cone or triangle shaped, first electrode and a ring shaped second electrode down-stream of the first electrode.

The system can use an additional downstream trailing electrode. The trailing electrode can be aerodynamically smooth so as not to interfere with the air flow. The trailing electrodes can have a negative electoral charge to reduce positive charged particles in the air flow. Trailing electrodes can also be floating or set to ground. Trailing electrodes can act as a second surface to collect positively charged particles. Trailing electrodes can also reflect charged particles towards the second electrodes. The trailing electrodes can also emit a small amount of negative ions into the air flow which can neutralize the positive ions emitted by the first electrodes.

The assembly can also use interstitial electrodes positioned between the second electrodes. The interstitial electrodes can float, be set to ground, or be put at a positive high voltage, such as a portion of the first electrode voltage. The interstitial electrodes can deflect particulate towards the second electrodes.

The first electrodes can be made slack, kinked or coiled in order to increase the amount of ions emitted by the first electrode.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Modifications and variations may be made to the disclosed embodiments without departing from the subject and spirit of the invention as defined by the following claims. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. An air treatment device comprising:
    a housing;
    a plurality of electrodes supported by the housing;
    a voltage generator operatively coupled to the electrodes, the voltage generator being operable to generate voltage;
    at least one sensor operatively coupled to the voltage generator, the sensor having a light source and a light detector, the voltage generated by the voltage generator being adjusted based on a condition sensed by the sensor; and
    a processor operatively coupled to the sensor and the voltage generator, the processor being operable to cause an adjustment of the voltage based on a signal received from the sensor, the signal being related to the condition sensed by the sensor.

2. The air treatment device of claim 1, wherein the sensor is a particulate detector.

3. The air treatment device of claim 2, wherein the particulate detector is a photoelectric unit.

4. The air treatment device of claim 1, wherein the sensor detects the presence of humans or animals.

5. The air treatment device of claim 1, wherein the sensor is a passive IR detector.

6. The air treatment device of claim 1, wherein the sensor is an ozone sensor.

7. The air treatment device of claim 1, wherein the sensor is a remote unit.

8. The air treatment device claim 7, wherein the remote unit is a wireless communication device.

9. The air treatment device of claim 1, wherein the electrodes, the voltage generator and the sensor are a single unit.

10. The air treatment device of claim 1, wherein the condition sensed is selected from the group consisting of: (a) a presence of humans; (b) a presence of animals; (c) a change in ozone level; and (d) a change in particulate level.

11. An air treatment device comprising:
    a housing;
    a plurality of electrodes supported by the housing;
    a voltage generator operatively coupled to the electrodes, the voltage generator being operable to generate voltage;
    at least one ozone sensor operatively coupled to the voltage generator, the ozone sensor being operable to produce a plurality of signals used for adjusting the voltage generated by the voltage generator; and
    a processor operatively coupled to the ozone sensor and the voltage generator, the processor being operable to cause an adjustment of the voltage based on: (a) a first signal received from the ozone sensor representing a first ozone concentration and (1) a second signal received from the ozone sensor representing a second ozone concentration.

12. The air treatment apparatus of claim 11, wherein the first ozone concentration is associated with a light transmission, and the second ozone concentration is associated with a different light transmission.

13. The air treatment device of claim 11, wherein the ozone sensor includes at least one light source and at least one light source detector.

14. The air treatment device of claim 11, wherein the ozone sensor is a remote unit.

15. The air treatment device of claim 14, wherein the remote unit is a wireless communication device.

16. The air treatment device of claim 11, wherein the electrodes, the voltage generator and the sensor are a single unit.

17. An air treatment device comprising:
    a housing;
    a plurality of electrodes supported by the housing;
    a voltage generator operatively coupled to the electrodes, the voltage generator being operable to generate voltage;
    at least one ozone sensor operatively coupled to the voltage generator, the ozone sensor operable to provide a plurality of signals relating to a plurality of sensed ozone concentrations; and
    a processor operatively coupled to the ozone sensor and the voltage generator, the processor being operable to adjust the voltage based on comparing a first signal representing a first ozone concentration to a second signal representing a second ozone concentration sensed by the ozone sensor.

18. The air treatment device of claim 17, wherein the ozone sensor includes at least one light source and at least light source detector.

19. The air treatment device of claim 17, wherein the processor adjusts a peak voltage of the voltage generator output.

20. The air treatment device of claim 17, wherein the processor adjusts a duty cycle of the voltage generator output.

* * * * *